United States Patent Office 3,276,594
Patented Oct. 4, 1966

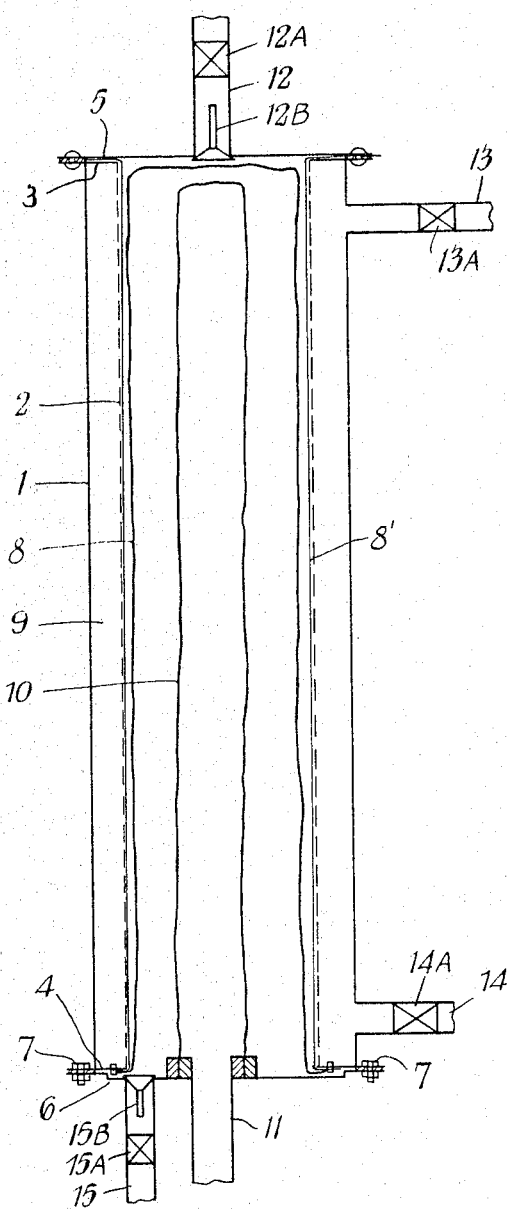

3,276,594
FILTER PRESSES
Ralph Derek Gwilliam, Cornwall, England, assignor to English Clays Lovering Pochin & Company Limited, Cornwall, England, a British company
Filed Sept. 23, 1963, Ser. No. 310,803
Claims priority, application Great Britain, Sept. 24, 1962, 36,302/62
5 Claims. (Cl. 210—350)

This invention relates to a filter press.

An object of the invention is to provide a filter press which will facilitate the removal of filtercake on the completion of a filtering operation.

According to the present invention, there is provided a filter press comprising a chamber, a flexible sleeve of filter medium therein which is closed at one end and has a mouth at the other end, an inlet for material to be filtered, and an outlet for filtrate, the filter sleeve being fixed within the chamber around its mouth, and the material inlet communicating with the inside of said filter sleeve, the arrangement being such that the material to be filtered may be introduced into said filter sleeve and caused to filter therethrough so as to separate the filtrate from solids contained in said material, the solids remaining in said filter sleeve and the filtrate passing through the walls of the sleeve from the inside to the outside thereof, the arrangement further being such that the filtrate is able to pass to said outlet, and being such that the separated solids may be removed from said filter sleeve by bringing its closed end through the mouth thereof, so that the sleeve is turned inside out.

For a better understanding of the invention and to show how the same may be carried into effect, reference will now be made by way of example to the accompanying drawing, which shows diagrammatically a longitudinal cross-section of a filter press.

The filter press shown in the drawing comprises a vertical, cylindrical, metal wall 1 having a perforated steel tube 2 arranged co-axially therein. The tube has circumferential end flanges 3 and 4 fixed thereto, and the ends of the wall 1 are also fixed to these flanges. The wall 1 forms part of a chamber closed at the upper end by a plate 5 secured to the flange 3 so as to produce a pressure-tight seal. At its lower end, the chamber has a plate 6 fitted to the flange 4 by clamps 7 in such a way that the plate 6 is readily removable and replaceable. When the plate 6 is in position, the seal is pressure-tight.

The tube 2 acts as a support for a flexible sleeve 8 of woven filter material arranged within the tube. Thus there is an annular space 9 between the sleeve 8 and the wall 1 of the chamber. The sleeve 8 has a mouth at its lower end and is closed at the upper end, and the sleeve is secured to the supporting tube 2 only around its open mouth. The filter sleeve 8 is enclosed in a protective nylon backing cloth 8' which prevents the filter sleeve from being mechanically damaged, e.g. by being cut by the edges of the perforations in the steel tube 2.

An elastic, non-porous membrane 10 of extruded rubber or latex is arranged within the filter sleeve 8. This membrane is also in the form of a sleeve, being closed at its upper end and being attached by its mouth to the protruding end of a pipe 11 passing through the center of the removable plate 6. Thus the pipe 11 communicates with the inside of the membrane sleeve 10, and its inner end constitutes a port in the chamber wall. Other ports are also formed in the chamber wall. Pipes 12, 13 and 14 all communicate through such ports with the inside of the chamber externally of the sleeves 8 and 10. A pipe 15 opens into the space between the sleeves 8 and 10, i.e. internally of the sleeve 8 and externally of the sleeve 10.

The pipe 11 is arranged to be connected to a supply of water under pressure (or other hydraulic pressure medium) for the purpose of dilating the membrane sleeve 10 when the removable plate 6 is clamped in position at the end of the chamber. The pipe 12 is connected to a supply of compressed air via a control valve 12A so that the pressure may be increased within the chamber externally of the filter sleeve 8. The port through which the pipe 12 communicates with the chamber has a non-return valve 12B arranged therein. As an alternative to increasing the pressure by introducing compressed air through the pipe 12, the pressure may be reduced in the chamber by connecting the pipe 13 via a control valve 13A to a vacuum pump or low pressure reservoir, and thereby withdrawing air from the chamber. As will be described below, the pipe 14 acts as a drain for filtrate. This filtrate may be drawn off through a valve 14A. A valve 15A controls entry through the pipe 15 of the liquid material to be filtered. The pipe 15 has a non-return valve 15B arranged therein to close the port by which the pipe communicates with the chamber.

In operation, the filter press is arranged as shown in the drawing, with the plate 6 clamped in position. All control valves are closed. The material to be filtered, for example clay slurry, is introduced into the press via the inlet pipe 15 by opening the control valve 15A. Thereafter the valve 15A is closed. Water or other hydraulic pressure medium is forced through the pipe 11 into the elastic sleeve 10, thereby to dilate the sleeve. As the sleeve 10 expands, the slurry is forced to filter through the woven filter cloth of the sleeve 8. The filtrate passes through the sleeve 8, the nylon backing cloth 8' and the perforations in the tube 2, into the annular space 9. The filtrate is drained at will through the valve 14A. The clay particles remain as a layer of filtercake squeezed between the sleeves 8 and 10.

The hydraulic pressure medium is withdrawn through the pipe 11 from the elastic sleeve 10, and the plate 6 is thereafter removed, together with the sleeve 10, by releasing the clamps 7. The sleeve 8 generally remains in place with its layer of filtercake. Compressed air is allowed to pass via the control valve 12A and non-return valve 12B into the chamber, so that the sleeve 8 is blown through the opening uncovered by the plate 6. The sleeve is turned inside out since it is secured at its mouth. Most of the filtercake flakes off the sleeve 8 when the sleeve is reversed in this manner. The remainder of the filtercake is blown from the sleeve 8 by the compressed air, thus freeing the pores of the filter. The filtercake is collected.

To prepare the filter press for the next batch of slurry, the chamber is connected via the valve 13A to the vacuum pump or low pressure reservoir. The sleeve 8 is thereby sucked back into the chamber to occupy the position shown in the drawing. The plate 6 and sleeve 10 are then replaced.

It will be appreciated that the filtering capacity of a single filter press is primarily dependent upon the surface area of the filter sleeve. For a given surface area and for a slurry of given solids content, the thickness of filtercake obtained in one filtering operation depends upon the volume of slurry filtered during that operation. However, the time taken to produce a desired filtercake thickness is not directly proportional to the cake thickness, since it would take longer to filter a given volume of slurry through a thick cake than through either the filter cloth alone or the filter cloth plus a thin cake. The minimum time during which the press is not actually being used for filtration, i.e. while the filtercake is being discharged and the press set up for a new filtering operation, is approximately constant and does not appreciably change with changes of cake thickness. Thus, bearing in mind the time taken to press a quantity of slurry and the time taken to discharge the resultant filtercake, it is possible to determine the thickness of filtercake which should be formed in each filtering operation in order to produce the optimum quantity of product, i.e. the maximum quantity of product over a period of time embracing several filtering operations. Then, for the given filter area and the given slurry composition, it is a relatively simple matter to calculate the volume of slurry needed to produce this desired filtercake thickness. This "optimum volume" of slurry could of course be contained in a filter sleeve enclosing exactly such volume, and thus having a definite "optimum diameter" to take into account the fact that it must also have the given filter area, as well as the desired volume. In each filtering operation, the sleeve is completely filled with slurry to ensure optimum working of the press. It has been found that, for example, a filter sleeve of 5½" to 6" diameter is suitable for clay slurries having a density of about 1.050 g./cc.

Instead of utilizing a sleeve of the above-defined "optimum diameter," use may be made of a sleeve having a diameter greater than the optimum. In this case, the slurry to be filtered is metered so that sufficient slurry to give the desired filtercake thickness is introduced into the sleeve prior to each filtering operation. This may in many cases prove an advantageous method of producing the maximum quantity of filtered product over a period of time. The length of the filter sleeve does not materially affect the ratio of sleeve volume to filter area, so that the longest practicable sleeve may be chosen. It is to be noted that if the filter sleeve were too long, difficulties would arise in discharging the cake from the sleeve.

It would be appreciated that the woven filter sleeve must be as fine as possible to prevent solid particles passing through the filter. The sleeve alone serves as the filter. The sleeve is not intended to be a support for a bed of particles acting as filter medium, since for efficient operation and a rapid cycle, the filtercake layer must not be too thick, as explained above. The cloth is flexible, yet strong enough to withstand the reversals and the back blowing by compressed air.

The perforations in the steel supporting tube 2 are of small diameter, so that the filter sleeve is not forced therethrough at high pressures, with the consequent risk of cutting the material of the sleeve. To guard further against such damage, the inlets 12 and 15 which communicate with the chamber in the region of the sleeves 8 and 10, are so protected by the non-return valve 12B and 15B that, when not in use, they present flush surfaces to the inside of the chamber. Where possible, edges and corners are rounded off to prevent cutting of the sleeve.

The filter press described above is capable of operating automatically. Once the cycle is commenced, the various operations may be carried out in their correct sequence at predetermined intervals. A number of similar filter presses may be arranged so that they discharge in rotation. Thus a quantity of slurry may be filtered to produce a relatively smooth flow of product. This ensures a regular flow of clay to a succeeding processing step.

The steel tube 2 is capable of withstanding high pressures, so that residual liquid can be pressed out of the filtercake to give a product which is almost dry. It has been found that the use of water or other hydraulic pressure medium to produce the pressure by dilating the elastic sleeve, has further advantages, apart from that of being able to produce high pressures. For example, when the slurry itself is pumped directly into a filter press, abrasive particles in the slurry quickly wear conduits and especially pumps. The hydraulic pressure medium, however, has not the same rapid wearing action.

The filter press described above has the advantage that the filter sleeve need not be scraped to remove the filtercake. The chance of blinding the filter sleeve, i.e. of blocking the pores of the filter cloth, is thus greatly reduced. Particles of filtercake may be readily blown out of the pores by the compressed air.

I claim:
1. A filter press for the producing of a filtercake of low moisture content comprising: a longitudinally extending chamber having an opening at one end; a rigid, perforate tube located within said chamber in substantially coaxial relation therewith; a flexible bag of filter material disposed within said rigid perforate tube and having a mouth which is secured to the chamber at said opening thereof, said flexible bag being supported by said rigid, perforate tube during a filtering operation; a removable closure member adapted to close the opening in said chamber in pressure-tight manner; an elastic non-porous bag secured to said closure member and arranged within and spaced from said flexible bag of filter material when said removable closure member closes said opening, means for introducing a pressure medium into said elastic non-porous bag for dilating said elastic, non-porous bag whereby pressure can be exerted on a material to be filtered which has been introduced into said flexible bag of filter material; a first inlet means for introducing the material to be filtered into the space between the non-porous bag and said flexible bag; a first outlet means in said chamber external of the perforate tube for the discharge of filtrate; a second inlet means for introducing compressed air into said chamber externally of said flexible bag of filter material to cause said flexible bag to move out of said chamber and be turned inside out when the closure member is removed; and a second outlet means for lowering the pressure in said chamber whereby after said flexible bag of filter material has been turned inside out it can be sucked back into the chamber in its filtering position.

2. A filter press as claimed in claim 1, comprising a porous, protective backing cloth disposed between said flexible bag of filter material and said rigid, perforate tube.

3. A filter press as claimed in claim 1, wherein said elastic, non-porous bag is constituted of rubber.

4. A filter press as claimed in claim 2, wherein said porous, protective backing cloth is constituted of nylon.

5. A filter press as claimed in claim 1, wherein said second inlet means is disposed at the end of said chamber which is opposite the open end thereof and said second inlet means faces the flexible bag.

References Cited by the Examiner

UNITED STATES PATENTS

| 817,252 | 4/1906 | Kneuper | 210—350 X |
| 2,271,814 | 2/1942 | Coolidge | 210—411 X |
| 2,985,308 | 5/1961 | Koupal | 210—411 X |

FOREIGN PATENTS

| 319,205 | 3/1957 | Switzerland. |

REUBEN FRIEDMAN, *Primary Examiner.*

J. DECESARE, *Assistant Examiner.*